(12) United States Patent
Harpin et al.

(10) Patent No.: US 11,135,534 B2
(45) Date of Patent: Oct. 5, 2021

(54) MODULAR SHAFT FOR DISC FILTER

(71) Applicant: ANDRITZ Ltd., Lachine (CA)

(72) Inventors: Christian Harpin, Boisbriand (CA); Phil Morency, Lachine (CA)

(73) Assignee: ANDRITZ LTD., Quebec (CA)

( * ) Notice: Subject to any disclaimer, the term of this patent is extended or adjusted under 35 U.S.C. 154(b) by 0 days.

(21) Appl. No.: 16/346,726

(22) PCT Filed: Nov. 17, 2017

(86) PCT No.: PCT/CA2017/051372
§ 371 (c)(1),
(2) Date: May 1, 2019

(87) PCT Pub. No.: WO2018/090140
PCT Pub. Date: May 24, 2018

(65) Prior Publication Data
US 2020/0070072 A1 Mar. 5, 2020

Related U.S. Application Data

(60) Provisional application No. 62/424,225, filed on Nov. 18, 2016.

(51) Int. Cl.
*B01D 33/23* (2006.01)
*B01D 33/74* (2006.01)
(Continued)

(52) U.S. Cl.
CPC .............. *B01D 33/23* (2013.01); *B01D 33/74* (2013.01); *D21D 5/06* (2013.01); *B01D 2201/0415* (2013.01); *B01D 2201/40* (2013.01)

(58) Field of Classification Search
CPC .......... D21D 5/06; B01D 33/21; B01D 33/23; B01D 33/74
See application file for complete search history.

(56) References Cited

U.S. PATENT DOCUMENTS 1,223,245 A 4/1917 Charles
2,799,397 A 7/1957 Berline
(Continued)

FOREIGN PATENT DOCUMENTS

CN 102671440 9/2012
EP 1327470 7/2003
(Continued)

OTHER PUBLICATIONS

Michelle Barriault, International Search Report and Written Opinion, dated Feb. 1, 2018, pp. 1-11, Gatineau, Quebec, Canada.

*Primary Examiner* — Benjamin M Kurtz
(74) *Attorney, Agent, or Firm* — Kilpatrick Townsend & Stockton LLP

(57) ABSTRACT

A modular support structure comprising multiple chord or arc modules configured to selectively fixedly engage adjacent modules to define a completed annular support structure configured to support a rotary element of a rotary filter. The modular chord or arc segments may fixedly engaged an adjacent chord or arc segment through a fixing mechanism selected from the group consisting of: fasteners, clamps, pins, bolts, locks, locking mechanisms, key and socket mechanisms, spot welding, welding, adhesives, and other fastening mechanisms configured to engage and disengage adjacent chord or arc modules with ease.

15 Claims, 10 Drawing Sheets

(51) Int. Cl.
*D21D 5/06* (2006.01)
*B01D 33/80* (2006.01)
*B01D 33/21* (2006.01)

(56) References Cited

U.S. PATENT DOCUMENTS

| | | |
|---|---|---|
| 2,894,632 A | 7/1959 | Myers |
| 2,932,402 A | 4/1960 | Logue et al. |
| 3,193,105 A | 7/1965 | Putnam |
| 3,283,906 A | 11/1966 | Crane et al. |
| 3,291,312 A | 12/1966 | Peterson |
| 3,361,262 A | 1/1968 | Orr et al. |
| 3,504,802 A | 4/1970 | Luthi |
| 3,724,668 A | 4/1973 | Ahlquist |
| 3,825,124 A | 7/1974 | Davis |
| 3,890,235 A | 6/1975 | Davis |
| 3,960,729 A | 6/1976 | Peterson et al. |
| 4,075,103 A | 2/1978 | Kane |
| 4,216,093 A * | 8/1980 | Kane .................. B01D 33/23 210/247 |
| 4,251,376 A | 2/1981 | Badino |
| 4,678,575 A * | 7/1987 | Frykhult .............. B01D 33/23 210/327 |
| 4,814,093 A * | 3/1989 | Frykhult .............. B01D 33/21 210/780 |
| 5,032,270 A | 7/1991 | Nilsson et al. |
| 2003/0217999 A1 | 11/2003 | Jones |
| 2004/0159603 A1 | 8/2004 | Boulnois et al. |
| 2006/0260999 A1 * | 11/2006 | Danielsson .......... B01D 29/58 210/402 |

FOREIGN PATENT DOCUMENTS

| | | |
|---|---|---|
| WO | 9212783 | 8/1992 |
| WO | 2004076026 | 9/2004 |

* cited by examiner

MODULAR SHAFT FOR DISC FILTER

CROSS-RELATED APPLICATION

This application claims the benefit of PCT International Patent Application Number PCT/CA2017/051372, filed on Nov. 17, 2017, which in turn claims the benefit of U.S. Provisional Pat. App. No. 62/424,225 filed on Nov. 18, 2016, the entirety of each is incorporated herein by reference.

BACKGROUND OF THE INVENTION

1. Technical Field

The present disclosure relates to rotary filters used in a variety of industries including the pulp and paper, wastewater treatment, food processing, cement production, and mining industries.

2. Related Art

Rotary filters may generally be classified into two categories: "drum filters" and "disc filters." A rotary drum filter may consist of a generally cylindrical drum disposed generally annularly around a center shaft and support structure. Likewise, a rotary disc filter may consist of a series of filter discs arranged along a center shaft and extending generally annularly from the center shaft. Portions of the center shaft or support structure are hollow and converge at a drainage end of the rotary filter. A vacuum connects to the drainage end. For convenience, the term "rotary element" will be used in this disclosure broadly to refer to either a filter drum or the filter discs of a rotary filter. Filter cloth generally covers the rotary element.

In operation, the center shaft is disposed horizontally across a vat containing a slurry of solid and liquid particles. The slurry partially submerges the rotary element. As the center shaft and rotary element rotates through the slurry, the filter cloth and the vacuum cause a layer of slurry to accumulate on the outer surface of the rotary element. The vacuum facilitates extracting the slurry's liquid component filters through the filter cloth. The liquid filtrate then flows through the hollow portions of the support structure before exiting at the drainage end. At this stage, the filtrate is typically cloudy.

As the rotary element continues to rotate, the rotary element lifts the layer of wet solids from the slurry and continues to separate the solid and liquid slurry components. At this stage, the filtrate begins to run clear. Maximum liquid drainage generally occurs near the apex of rotation. After the solids layer on the rotary element rotates past the apex of rotation, the vacuum is released and the solids layer begins to turn downwardly toward the center chute and conveyor. Cleaning devices, such as scrapers, "doctor blades," water showers, air blowers, chutes, and the like remove and collect the dewatered layer of solids from the rotary element. In this manner, the cleaning devices clean the rotary element and re-expose the filter cloth before the downward moving portion of the rotary element re-enters the slurry in the vat. As the rotary element continues to rotate, the filtering process repeats continuously.

Rotary filters can be used in a variety of industries. For example, in the pulp and paper industry, operators may a use rotary filter to dewater and collect pulp after washing. The pulp clings to the filter cloth and accumulates to form a pulp mat. Liquid filtrate may be collected for further processing or disposal. The cleaning devices then scrape off the dewatered pulp mat for further processing.

Rotary filters can also be used to filter lime mud (e.g., a slurry with a high content of calcium carbonate, $CaCO_3$) out of a slurry.

Over time, the filter cloth may tear and some of the solid portion of the slurry may enter the hollow portions of the support structure. If the solids are abrasive, the solids will eventually wear down the support structure. Rotary filters may have long service lives, typically in the range of 15 to 25 years. Eventually, the shafts or other portions of the support structure crack and need replacing. Installation constructors commonly install rotary filters when a processing plant is first constructed. This practice affords the installers more freedom to maneuver the rotary filter and installation equipment than is typical after the processing plant is operational. For example, during the construction stage, the walls or roof to the processing plant may not be completed, which permits installers to position cranes and other installation equipment with relative ease. Other equipment in a processing line may not be present when the rotary filter is first assembled, which further facilitates installation.

To install a new rotary filter, installers typically first place the vat at an intended position in a process line. The installers then use a crane to lower the journals of a center shaft into bearings on either side of the vat, and thereby place the center shaft horizontally over the vat. If the rotary filter is a disc filter, each filter disc can be comprised of multiple sectors that may generally take the shape of truncated circular sector. Once the center shaft is in position, the installers may install the series of sectors that define each filter disc. The installers may finish installation by welding a hood to the top of the vat. This hood likewise covers the rotary element and center shaft.

When the time comes to repair or replace the center shaft and rotary element, the processing plant tends to have been operational for quite some time. Furthermore, a plant owner's economic interests tend to motivate keeping at least a portion of the process line operational if possible. With the remaining process equipment installed and possibly operational, a servicer's ability to extract the center shaft and disc filters or drum can be greatly reduced. To replace the center shaft and filter discs, servicers generally disassemble the filter disc segments while the center shaft is still disposed in the vat. A crane is then typically positioned to extract the center shaft. The roof of the processing plant is likely complete by this time, and even though the servicers may be able to position smaller cranes to extract the center shaft, the clearance between the top of the hood and the roof may not be sufficient to accommodate the diameter of the center shaft and the height of the crane. Therefore, the operator may have to cut away a section of the processing plant's roof to extract and replace the center shaft or rotary element support structure.

Rotary filters are also constrained by the vacuum drop legs that connect to the drainage end of the rotary filter. Entrained air and filtrate flows several stories down the run of drop leg at sufficiently high velocity to pull further filtrate and air upstream of the drop leg. The run of the drop leg must be at least 6.5 meters above the seal tank level or at least 7.5 meters above the basement floor. As a result, the rotary filter is typically positioned three floors above ground, often close to the facility roof, and in a landlocked position that renders the rotary filter difficult to access even with a large crane.

Cutting away the roof and extracting a pre-assembled support structure adds significant time to replacement or refurbishment of the center shaft and/or support structure. The process can take weeks to months to execute. Furthermore, the use of heavy equipment increases the safety risk to nearby personnel and damage risk to proximate equipment.

SUMMARY OF THE INVENTION

The problem of delay in replacing a rotary filter support structure caused by insufficient clearance between the top of the hood of the rotary filter assembly and adjacent structures or due to wear or cracking of the support structure or center shaft is mitigated by using a modular support structure comprising multiple chord or arc modules configured to selectively fixedly engage adjacent chord or arc modules to define a completed annular modular support structure configured to support the rotary element. As used herein, "support structure" can mean the center shaft or rotor component of a rotary filter. The chord or arc modules may fixedly engage an adjacent chord or arc segment through a fixing mechanism selected from the group consisting of: fasteners, clamps, pins, bolts, locks, locking mechanisms, key and socket mechanisms, spot welding, welding, adhesives, and other fastening mechanisms configured to engage and disengage adjacent chord or arc modules with ease. Affixing adjacent chord or arc modules with such a fixing mechanism may thereby allow the modules to retain modularity when the rotary filter is not operational.

Furthermore, Applicant has discovered that conventional pre-assembled support structures experience more stress than modular support structures. Stress may come from a variety of sources including the load of the slurry on the downward moving portions of the support structures and the vacuum fluidly communicating with the interior of the support structures. With an exemplary modular support structure, manufacturers desirably precision machine the ends of the individual modules at the manufacturing facility to allow the adjacent modules to be fitted and affixed to adjacent modules with a greater degree of precision than is possible with conventional pre-assembled support structures. Without being bounded by theory, Applicant believes that precision machining the ends of the modules to ensure precise fitting to adjacent modules, more evenly distributes loads across the modular support structure. By avoiding localized stress on the modular structure for longer periods, Applicant believes that the exemplary embodiments described herein can result in reduced instances of stress fractures throughout the modular support structure over time compared to pre-assembled single-piece support structures. Additionally, when maintenance is eventually required and if deficiencies are localized to individual modules, maintenance personnel may replace individual modules without disassembling the entire modular support structure, thereby reducing maintenance time and increasing the amount of time a unit may remain operational.

Therefore, exemplary embodiments of the present disclosure may allow for faster repair or replacement of modular support structures in disc filters or drum filters compared to conventional pre-assembled single-piece support structures. Additionally, the exemplary embodiments described herein may prolong the operating life of the modular support structures due to the reduced stress.

It is further contemplated that the exemplary embodiments described herein may reduce the risk of injury to personnel and equipment during the repair or replacement of the modular support structures, reduce the clearance required for the repair and replacement of the modular support structures, and significantly reduce handling and installation costs.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating the disclosed embodiments.

FIG. 1 depicts a fully assembled rotary disc filter.

FIG. 3B more clearly depicts the flow of filtrate through a transverse drainage conduit into the axial conduit.

DETAILED DESCRIPTION OF THE INVENTION

Figure 1:
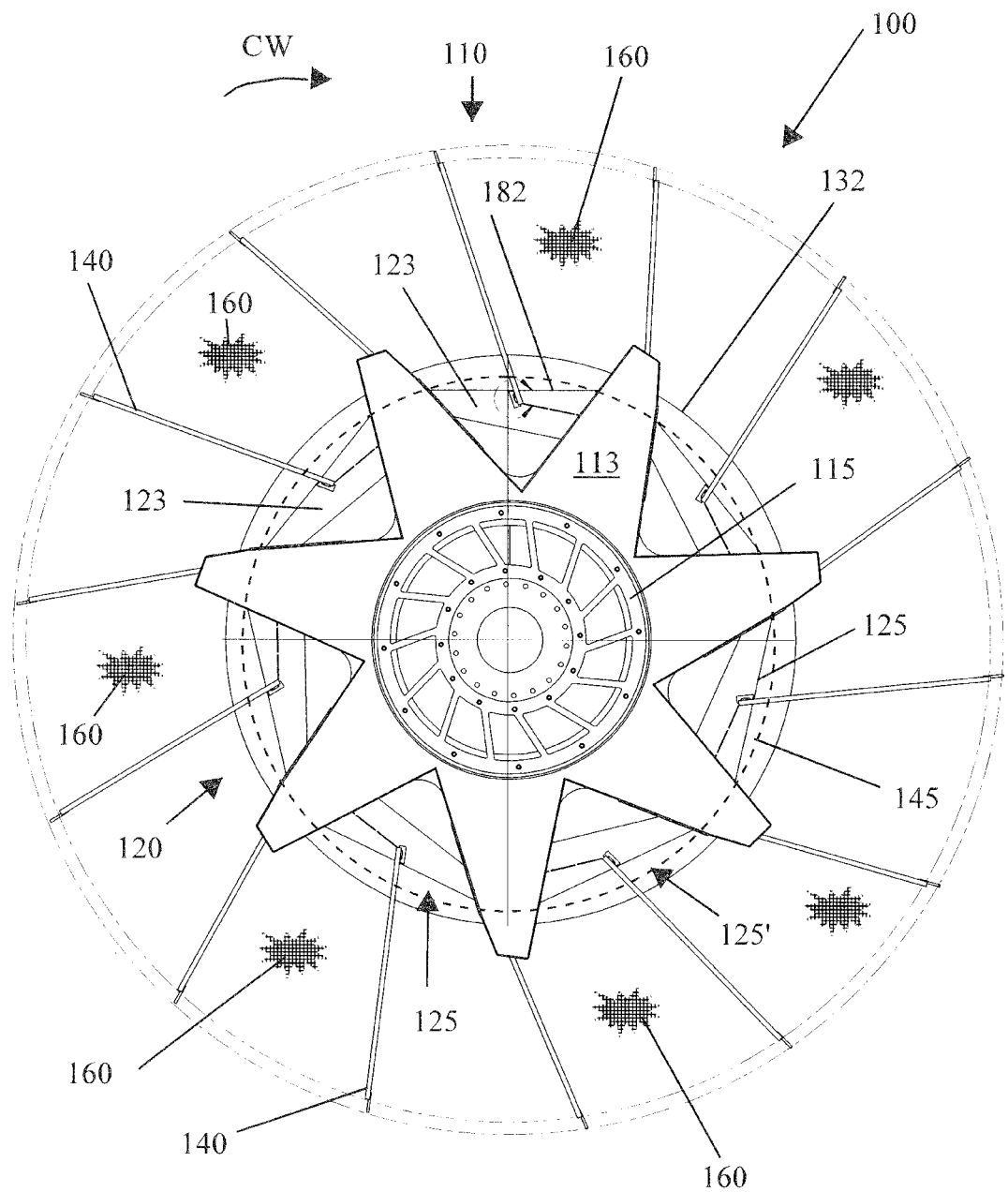
FIG. 1 is a side view of a drainage end of an exemplary modular support structure looking down the modular support structure's axis of rotation.

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Corresponding reference characters indicate corresponding parts throughout the several views. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although specific terms are used in the following description for the sake of clarity, these terms are intended to refer only to the particular structure of the embodiment selected for illustration in the drawings, and are not intended to define or limit the scope of the disclosure.

The singular forms "a," "an," and "the" include plural referents unless the context clearly dictates otherwise. Numerical values should be understood to include numerical values that are the same when reduced to the same number of significant figures and numerical values that differ from the states value by less than the experimental error of conventional measurement technique of the type described in the present application to determine the value.

All ranges disclosed herein are inclusive of the recited endpoint and are independently combinable (for example, the range "40 degrees to 60 degrees" is inclusive of the endpoints, 40 degrees and 60 degrees, and all intermediate values.

As used herein, approximating language may be applied to modify any quantitative representation that may vary without resulting in a change in the basic function to which it is related. Accordingly, a value modified by a term or terms, such as "about" and "substantially," may not be limited to the precise values specified. The modifier "about" should also be considered as disclosing the range defined by the absolute values of the two endpoints. For example, the expression "from about 2 to about 4" also discloses the range "from 2 to 4."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet' and "outlet" are relative to a fluid flowing through them with respect to a given structure, e.g. a fluid flows through the inlet into the structure and flows through the outlet out of the structure. The terms "upstream" and "downstream" are relative to the direction in which a chips or water flow or a signal moves through various components, i.e. the signal encounters an upstream component prior to encountering the downstream component.

The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

FIG. 1 depicts a rotary filter in which the rotary filter is an exemplary rotary disc filter assembly 100 comprising an exemplary modular support structure 120. In the depicted embodiment, the modular support structure 120 supports multiple disc sectors 160. A set of multiple disc sectors 160 together define a filter disc 110. A rotary disc filter assembly 100 comprises multiple filter discs 110 along the length L of the modular support structure 120 (see FIG. 2). During operation, the modular support structure 120 and the filter discs 110 rotate around the rotary disc filter assembly's axis of rotation R in a clockwise CW direction. The direction of rotation may be reversed in other exemplary rotary filters.

Figure 2:
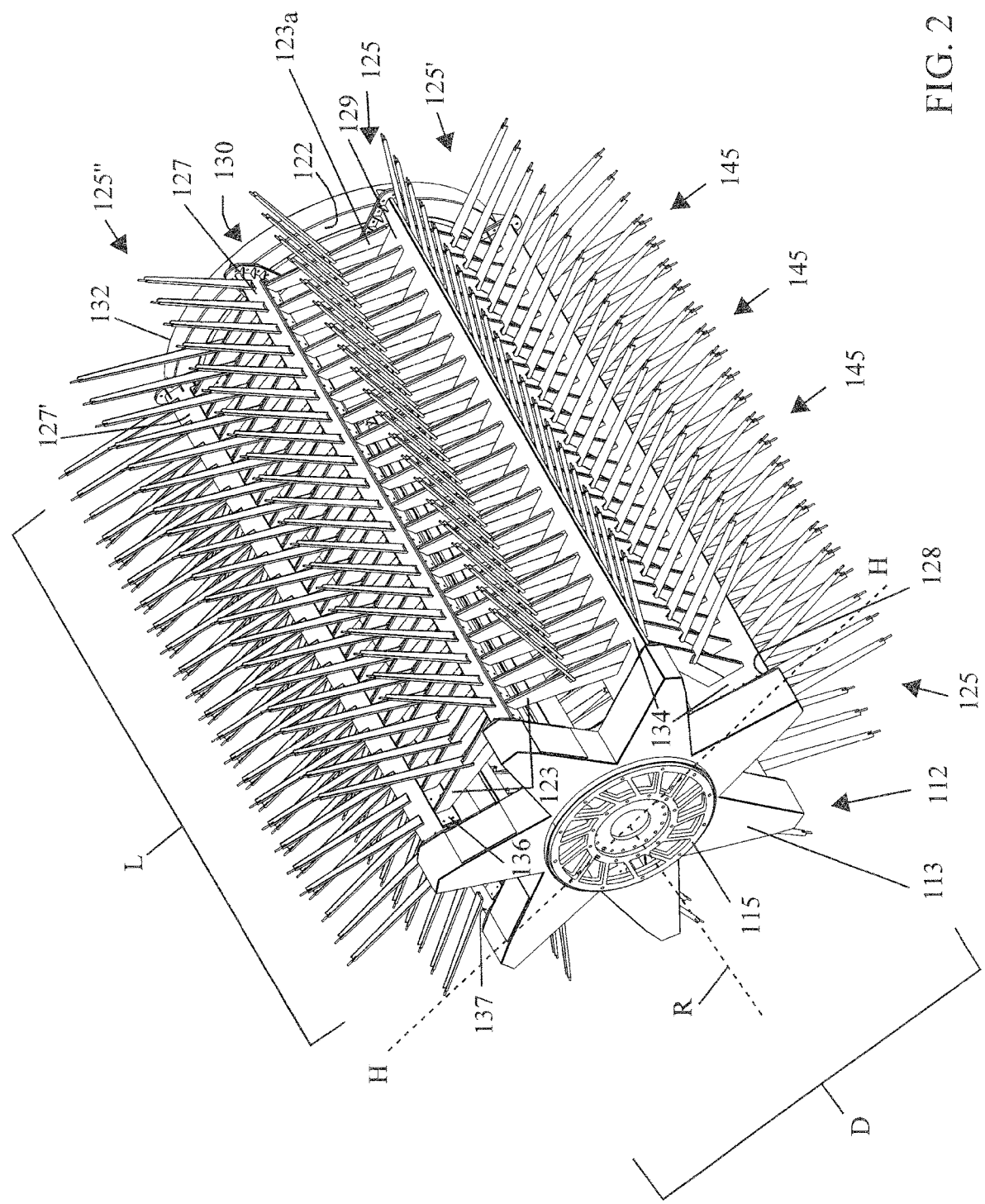
FIG. 2 is a perspective view of the rotary disc filter assembly of FIG. 1. The disc sectors have been removed to better depict an exemplary modular support structure.

As more clearly depicted in FIG. 2, the rotary disc filter assembly 100 comprises a drainage assembly 113 disposed at a drainage end 112. The drainage end 112 is distally disposed from a second end 130 of the rotary disc filter assembly 100. The drainage assembly 113 may encompass a valve plate 115. The valve plate 115 generally prevents process fluids from leaking out of the rotary disc filter assembly 100. A bearing assembly 132 may be disposed at the second end 130.

An exemplary modular support structure 120 comprises multiple support structure modules 125. Each module 125 has a first end 142 and a distal end 143. It will be understood that this disclosure relates to modular support structures for rotary filters generally and that the embodiments described herein are provided by way of example and are not intended to limit the claims. A rotary filter comprising support structure modules 125 configured to be assembled and disassembled faster than conventional pre-assembled cast, welded, or fabricated rotary filter shafts or support structures are considered to be within the scope of this disclosure.

In the exemplary embodiment shown in FIG. 2, each of the modules 125 comprises an axial arm 127. The axial arm 127 is disposed parallel to the axis of rotation R. The axial arm 127 has a first end 128 engaging a drainage assembly 113 at the drainage end 112 of the rotary disc assembly 100. The axial arm 127 also comprises a second end 129 engaging a bearing assembly 132 at the second end 130 of the rotary disc assembly 100. A series of transverse beams 123 extends from a first side 134 of the axial arm 127. The transverse beams 123 may each have a distal end 136 (i.e. distal from the axial arm 127) configured to engage a second side 137' of an adjacent axial arm 127' of an adjacent module 125'. The first side 134 of the axial arm 127 may be disposed at an angle relative to the second side 137 of the axial arm 127. In other exemplary embodiments, the axial arm 127 may be generally cylindrically shaped and the beams 123 may be configured to engage the generally cylindrical axial arms 127 at different angles.

Figure 9:
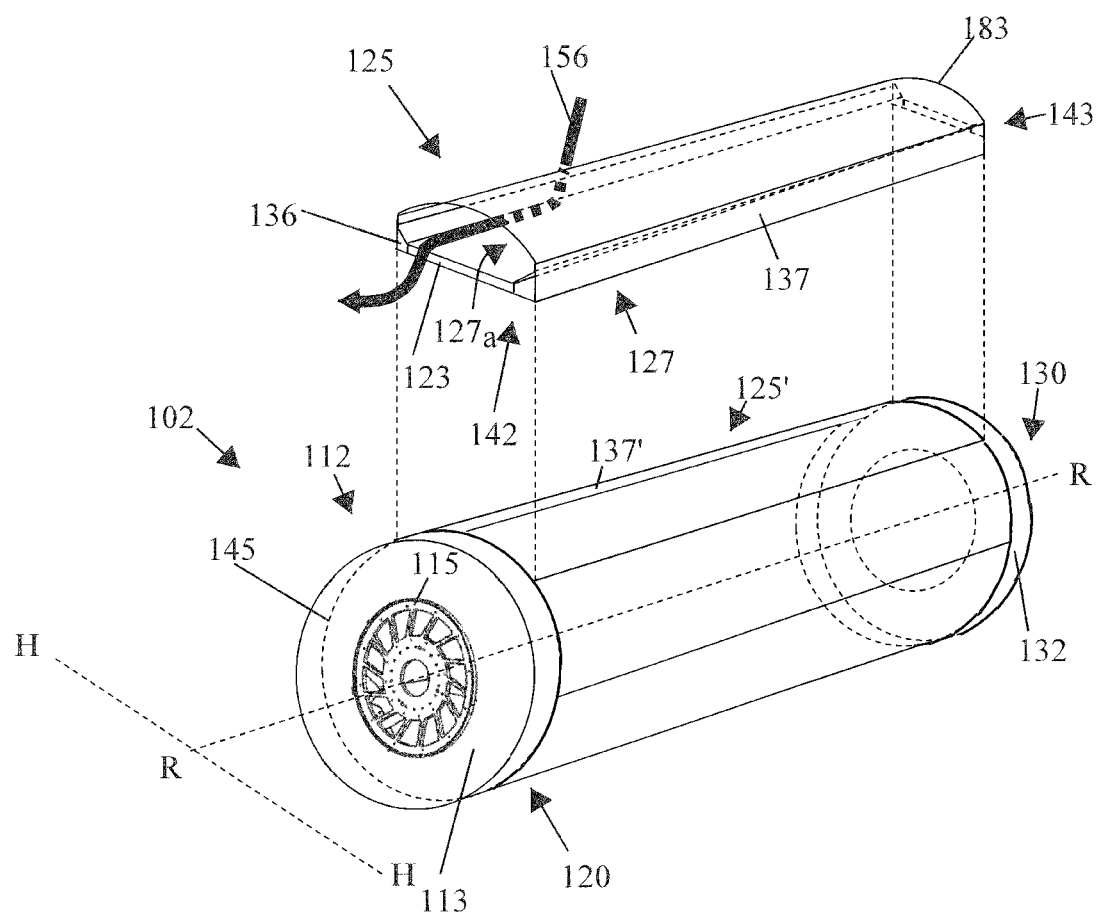
FIG. 9 is a partially exploded schematic view of a rotary drum filter having an exemplary modular support structure.

In the depicted embodiment, each of the axial arms 127 is an axial conduit $127_a$ configured to convey filtrate 156 (FIG. 3A) from drainage conduits $123_a$ to the drainage end 112 of the rotary disc filter assembly 100. Furthermore, each of the transverse beams 123 depicted in FIG. 2 is a drainage conduit $123_a$ configured to support two disc sectors 160 and to fluidly communicate with the axial conduit $127_a$. In other exemplary embodiments, particularly rotary drum disc filters, the transverse beams 123 and the drainage conduit $123_a$ may be separate elements. One or more drainage conduits $123_a$ may be disposed above the transverse beams 123. In other exemplary embodiments, drainage conduits $123_a$ may be absent and an axial conduit $127_a$ may be disposed above the transverse beams 123 (FIG. 9). In embodiments wherein the transverse beams 123 and the drainage conduits $123_a$ are separate elements, the transverse beams 123 are preferably configured to engage a first module 125 to an adjacent module 125' whereas the drainage conduit $123_a$ or axial conduit $127_a$ fluidly communicates with the drainage end 112 of the rotary disc filter assembly 100 through one or more intermediate conduits to thereby transfer filtrate through the modular support structure 120.

It will be understood that in other exemplary embodiments, not all exemplary modules 125 need to have the same elements. It is contemplated that an exemplary modular support structure 120 may comprise two or more different types of support structure modules 125 (compare FIG. 2 with FIG. 9). By way of example, a first type of support structure module may have a first type of drainage conduit extending from a transverse conduit (see FIG. 2). The first type of drainage conduit may have a set of dimensions. The first type of support structure module may be disposed next to a second type of support structure module (see FIG. 9), wherein the second type of support structure module has a second type of drainage conduit having a different set of dimensions than the set of dimensions of the first drainage conduit.

FIG. 2 depicts modules 125, in which the transverse beams 123 each have distal ends 136 engaging the second side 137' of an adjacent axial arm 127' of an adjacent module 125'. Although the embodiment depicted in the figures shows holes for bolts or related fasteners to engage adjacent modules 125, 125' it will be understood that other exemplary modular support structures 120 may comprise other fixing mechanisms, such as clamps, pins, locking mechanisms, adhesives, spot welds, and other mechanisms known those in the industry. Preferred exemplary embodiments have one type of fixing mechanism to facilitate relatively quick assembly and disassembly of the modular support structure 120. It will be understood that in other exemplary embodiments, the transverse beams 123 may be configured to engage a module 125" that is not immediately adjacent to the first module 125 from which the transverse beams 123 extend.

The radially outer side 182 of the transverse beams 123 are chords in a reference circle 145. Two disc sectors 160 can affix to each transverse beam 123. When fully assembled, the arrangement of transverse beams 123 and disc sectors 160 create a series of filter discs 110 disposed along the length L of the modular support structure 120. In the depicted embodiment, each the radially outer side 182 of the transverse beams 123 in each reference circle 145 create a heptagon within the reference circle 145. However, nothing in this disclosure should be construed as limiting the shape of the profile of the transverse beams 123 of a fully constructed modular support structure 120. For example, the profile of the transverse beams 123 of a fully constructed modular support structure 120 may generally resemble a geometric shape, including a regular geometric shape, such as but not limited to a triangle, quadrilateral, pentagon, hexagon, octagon, nonagon, decagon, and circle. In other exemplary embodiments, the profile of the transverse beams 123 of a fully constructed modular support structure 120 may resemble an irregular geometric shape.

A series of sector guides 140 may extend generally radially from the modular support structure 120. In the depicted embodiment, a first sector guide $140_a$ extends from the axial conduit $127_a$ and a second sector guide $140_b$ extends from each the transverse drainage conduit $123_a$ on each module 125. As more clearly seen in FIG. 1, one or more sector guides 140 may be disposed at an angle relative to a radial line RL extending from the axis of rotation R. Filter disc sectors 160 are disposed between adjacent sector guides 140. The sector guides 140 may be affixed to a module 125 after the modular support structure 120 has been fully assembled.

Figure 3A:
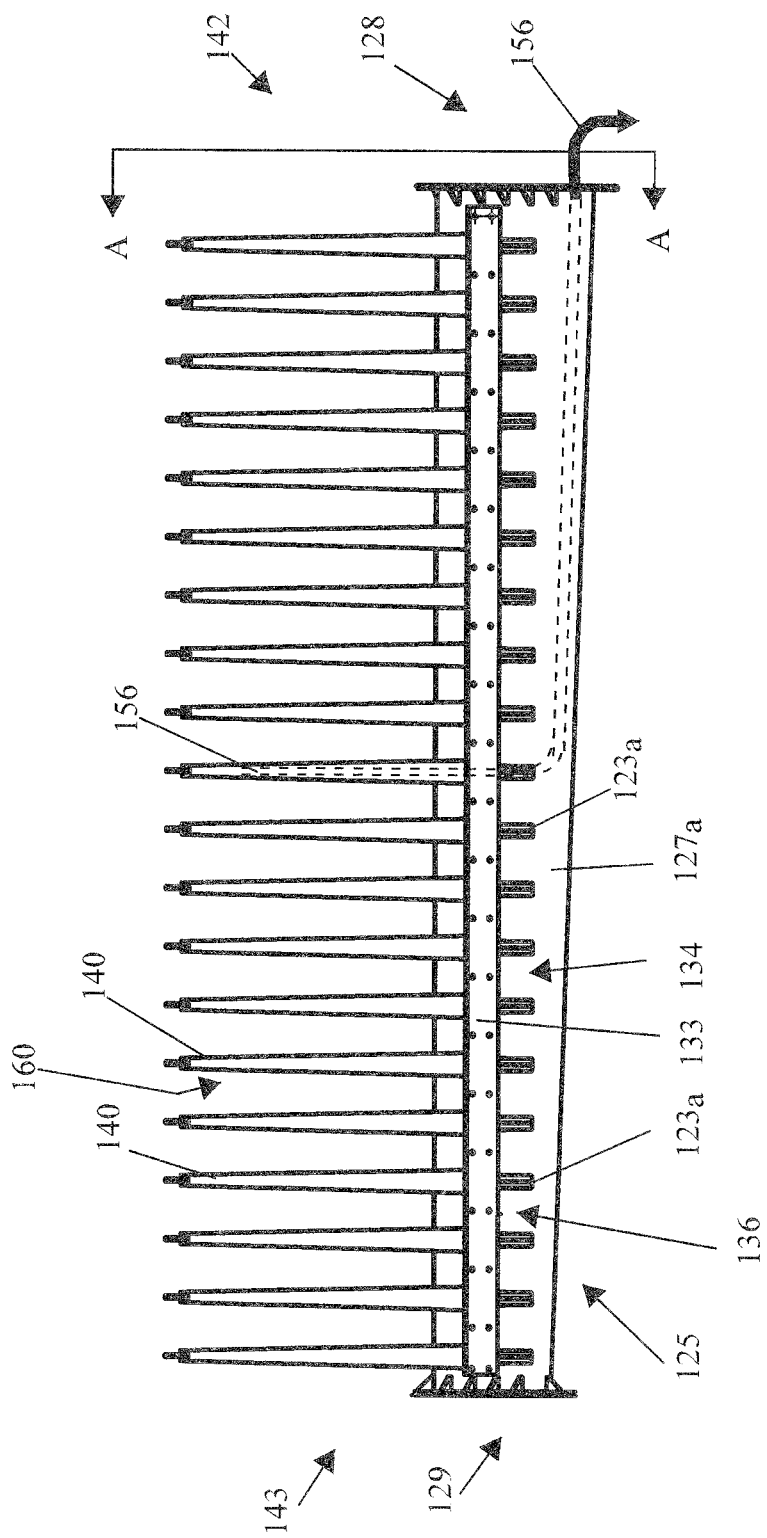
FIG. 3A is a side view of an exemplary support structure module showing the partial path of filtrate from a disc sector towards the first end of the axial conduit.

FIG. 3A is a side view of an exemplary module 125 in which the transverse beams 123 are transverse drainage conduits $123_a$ and the axial arm 127 is an axial conduit $127_a$. The axial conduit s first end 128 engages the drainage assembly 113 (FIG. 2) and the axial conduit's second end 129 engages a bearing assembly 132 (FIG. 2). The axial conduit's first end 128 and second end 129 may comprise a flange 159. Fastening mechanisms may engage the first end 128 to the drainage assembly 113 and the second end 129 to the bearing assembly 132. Example fastening mechanisms may comprise: fasteners, clamps, pins, locking mechanisms, adhesives, spot welds, welds, and other mechanisms known those in the industry. The axial conduit's first end 128 is longer than the axial conduit's second end 129 to allow filtrate 156 to flow to the drainage end 112 (FIG. 2) of the rotary filter disc assembly 100 via gravity.

During operation, filtrate 156 can flow from the slurry and through a disc sector 160 before entering a transverse drainage conduit $123_a$. The transverse drainage conduit $123_a$ extends from the axial conduit $127_a$ and fluidly communicates with the axial conduit $127_a$. As a module 125 rotates upwardly toward and past the line of horizontal bisection H (FIG. 2), the filtrate 156 flows generally from a point nearer the distal end 136 through the transverse drainage conduit $123_a$ and into the axial conduit $127_a$. The filtrate 156 then flows to the drainage assembly 113 and out of the rotary filter disc assembly 100 through the drainage end 112. The distal end 136 of each drainage conduit $123_a$ may engage a stabilizing strip 133. In the depicted embodiment, the stabilizing strip 133 stabilizes the distal ends 136 of the drainage conduits $123_a$, particularly when the distal ends 136 are not engaged to an adjacent module 125'. However, in other exemplary embodiments, the stabilizing strip 133 may be omitted.

Figure 3B:
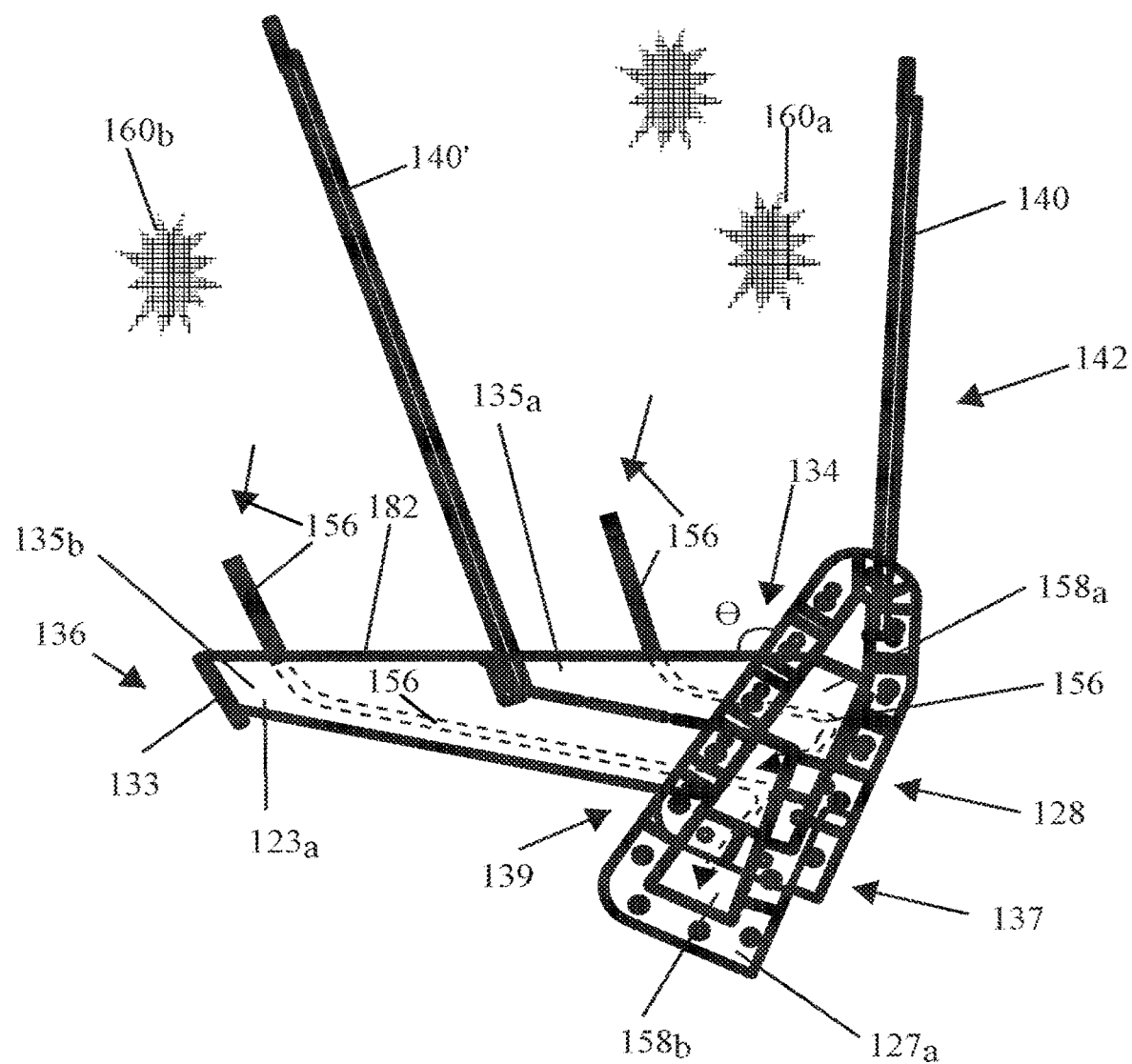
FIG. 3B is a cross-sectional view of the exemplary support structure module of FIG. 3A taken along line A-A.

FIG. 3B is a close-up cross-sectional view of the first end 142 of the module 125 depicted in FIG. 3A taken along line A-A. FIG. 3B more clearly shows disc sectors 160 disposed between adjacent sector guides 140, 140'. The transverse drainage conduit $123_a$ has a support end 139 that engages the first side 134 of the axial conduit $127_a$. The distal end 136 is distally disposed from the support end 139. The transverse drainage conduit $123_a$ further comprises multiple chambers $135_a$, $135_b$. The radially outer side 183 of the transverse drainage conduit $123_a$ defines a gap. The disc sectors 160 deposit filtrate 156 through this gap to thereby fluidly communicate with the chambers $135_a$, $135_b$ of the transverse drainage conduit $123_a$. A first disc sector $160_a$ fluidly communicates with a first chamber $135_a$ and a second disc sector $160_b$ fluidly communicates with a second chamber $135_b$. Downstream of the disc sectors 160, the first chamber $135_a$ fluidly communicates with a first axial chamber $158_a$ and the second chamber $135_b$ fluidly communicates with a second axial chamber $158_b$. In this manner, the filtrate 156 flows from the disc sectors 160 to the first end 128 of the axial conduit $127_a$. The first end 128 of the axial conduit $127_a$ comprises a flange 159. The radially outer side 182 of the modular support structure 120 may extend from the axial arm 127 at an angle θ relative to the first side 134 of the axial arm 127. The angle θ will change depending upon the number of modules 125 that comprise an exemplary modular support structure 120.

Figure 4:
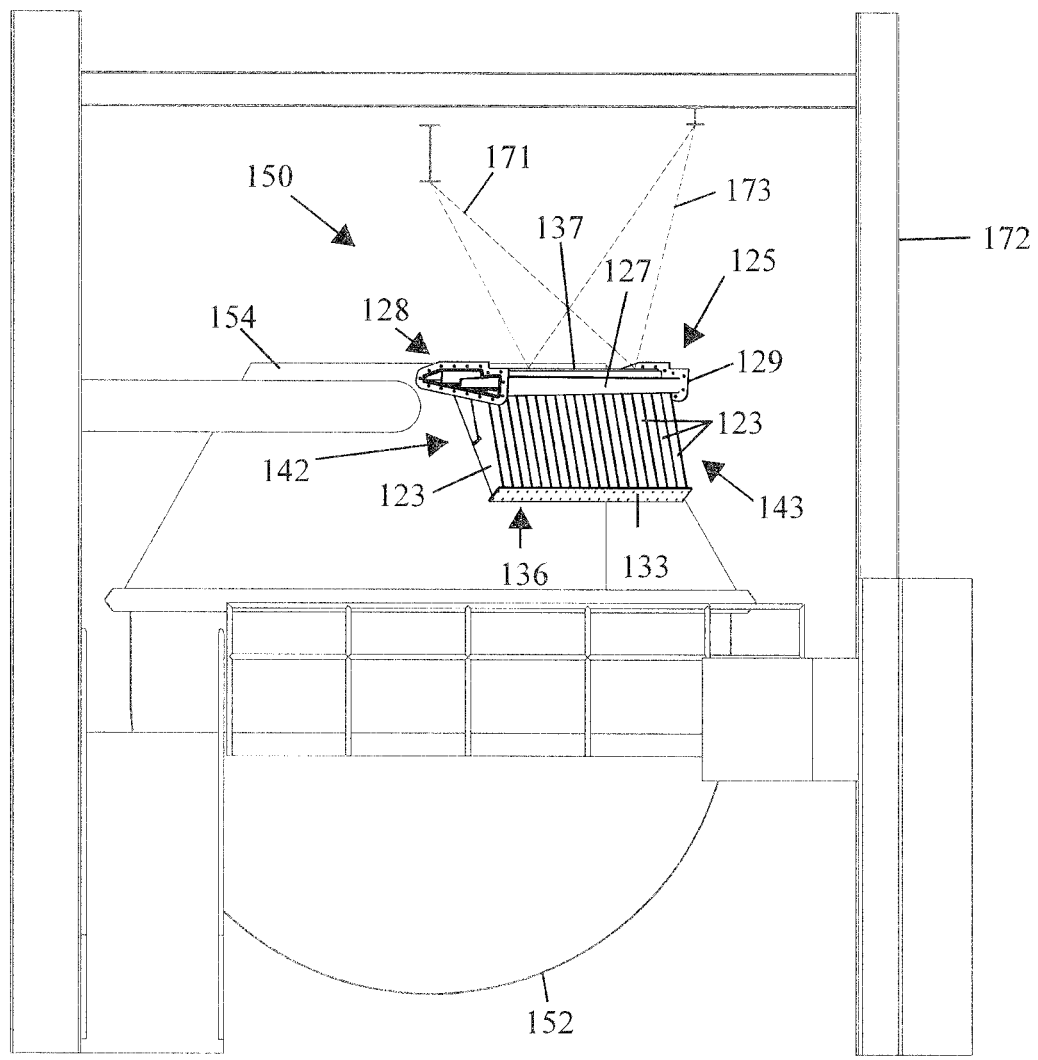
FIG. 4 is a schematic side view of a rotary disc filter depicting a crane holding an exemplary module of the exemplary modular support structure as seen facing the axis of rotation.

FIG. 4 depicts a side view of a rotary filter housing 150 comprising a vat 152 and a hood 154 disposed on top of the vat 152. When servicers seek to install a modular support structure 120, the operators may erect a crane 172 proximate to the rotary filter housing 150. It will be understood that a cane 172 may be an existing overhead cane in the facility, a temporary trolley beam, or other overhead crane configured to operate in or around a facility. Whereas spacing considerations (e.g. the clearance between the rotary filter unit and the roof of the facility, the location of the rotary filter unit relative to other equipment in a process line, etc.) typically required maintenance personnel to erect external cranes having load capacities of between about 100 tons ("T") and 600 T, assembling a modular support structure 120 will typically allow for smaller, lower capacity canes 172. The lower capacity cranes may have load capacities ranging from about 5 T to about 20 T for example. By selecting a smaller, lower capacity crane 172, maintenance personnel may be able to assemble or replace a modular support structure 120 faster than the maintenance personnel would be able to replace a conventional pre-assembled single piece support structure, all other factors being equal. Depending upon the configuration of a particular facility, using a smaller capacity crane 172 to assemble the modular support structure 120 may obviate the need to cut away part of the facility's roof to access the rotary filter unit.

Figure 5:
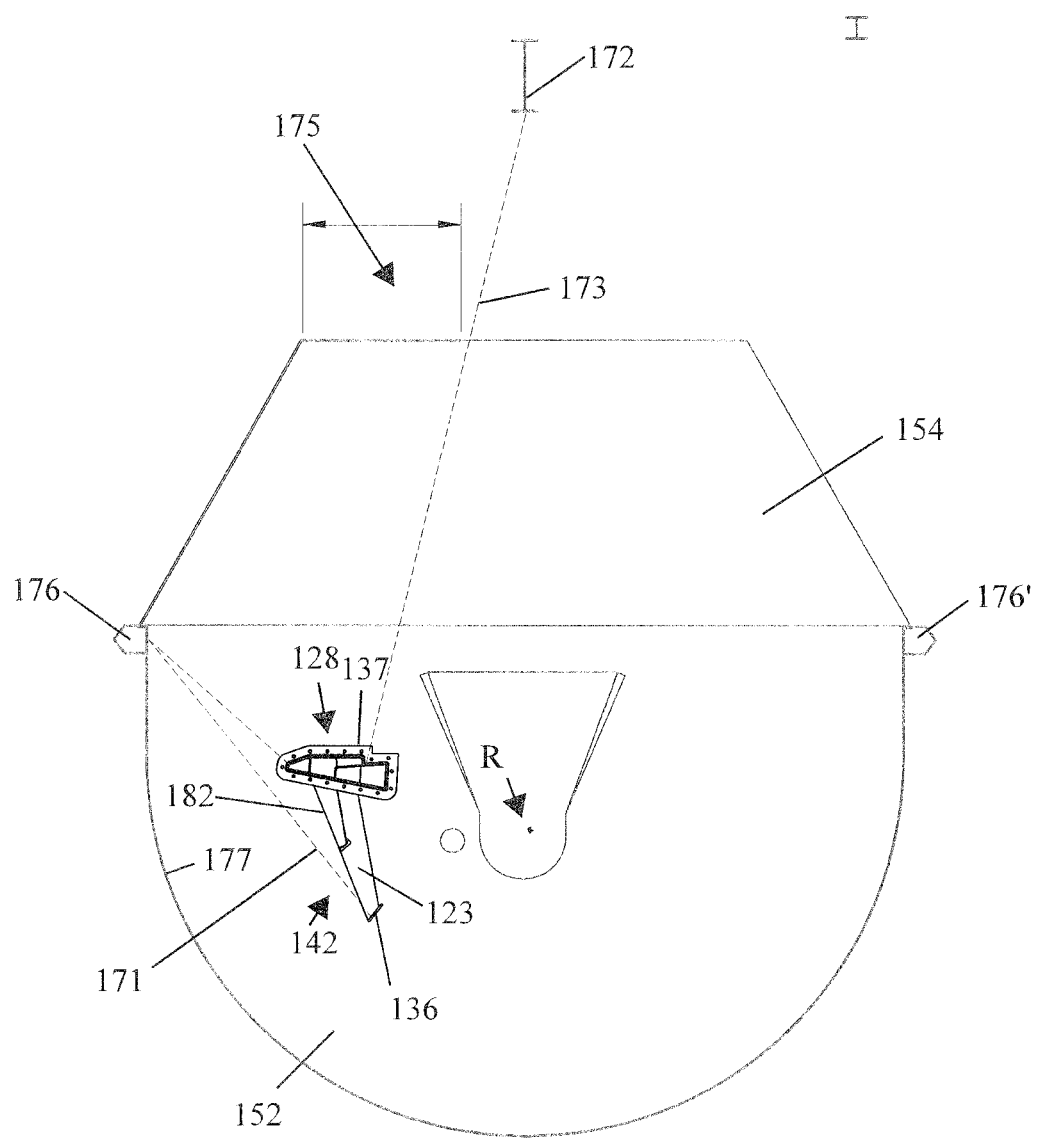
FIG. 5 is a schematic side view of an exemplary module having been inserted through an existing opening in the hood of the rotary disc housing.

The crane 172 may have a first cable 171 and a second cable 173 engaged to a module 125. In the depicted installation configuration, the first cable 171 and the second cable 173 may be on separate parallel tracks and thereby rotate the module 125 into position above a existing opening 175 (FIG. 5) in the hood 154. The module 125 may then be lowered through the existing opening 175. FIG. 5 shows the first cable 171 having been repositioned to the sidewall 177 of the vat 152. Installers may weld or otherwise engage one or more lugs 176 to the sidewall 177 of the vat 152 and thread the first cable 171 through the lugs 176 to thereby guide the module 125 through the existing opening 175 in the hood 154. The second cable 173 may then be used to position and balance the module 125 within the rotary disc housing 150.

Figure 6:
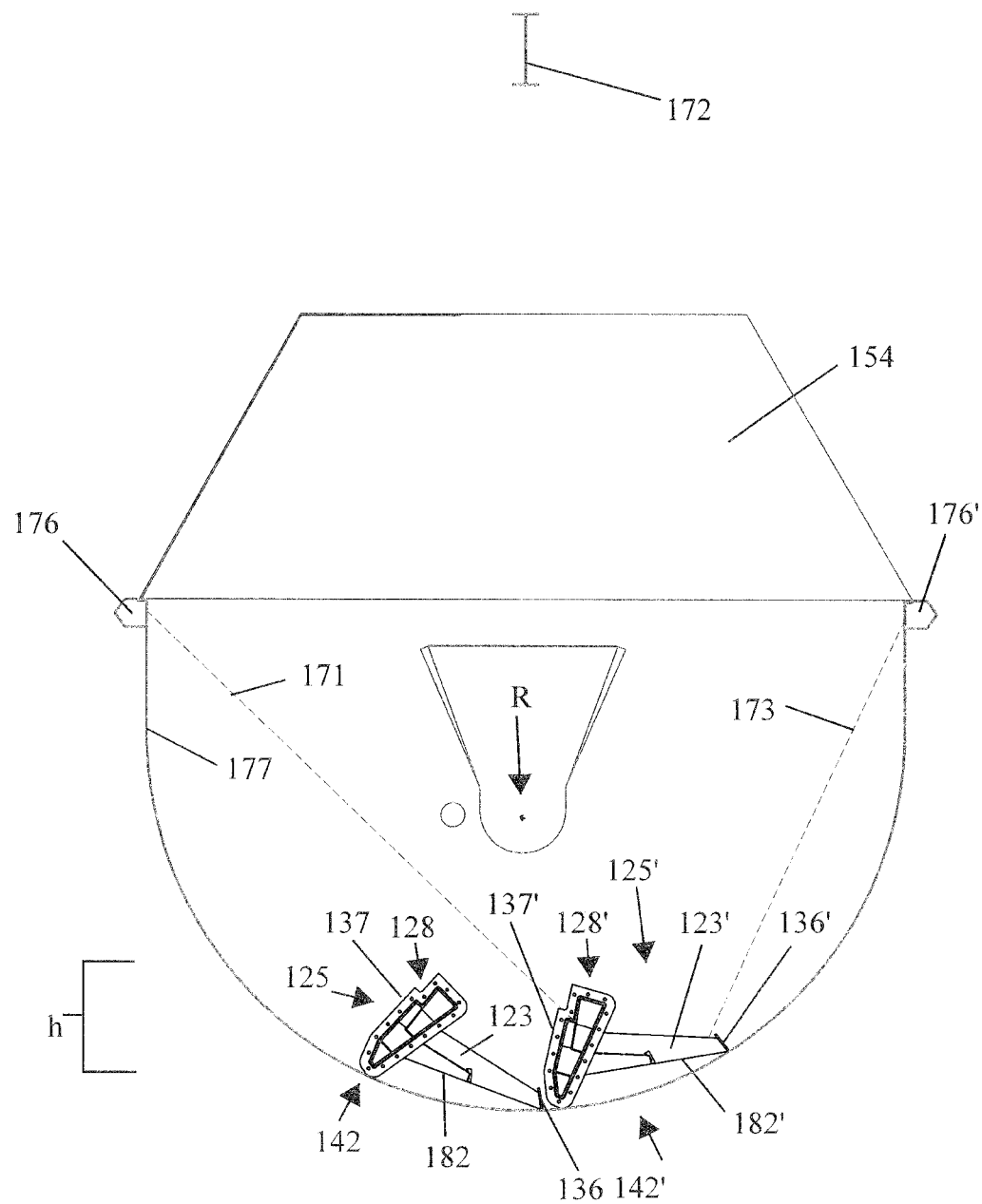
FIG. 6 is a schematic side view of two exemplary modules, wherein the two modules are being connected to form the modular support structure within the vat of the rotary disc housing.

FIG. 6 depicts a second module 125' being positioned adjacent to a first module 125. The first cable 171 extends through a first set of lugs 176 and the second cable 173 extends through a second set of lugs 176'. Workers may enter the vat 152 to engage the first module 125 to the second module 125'. Workers may use a fixing mechanism to engage the distal ends of the transverse beams 123 to the axial arm 127' of the adjacent (e.g. the second) module 125'. The height h of the module 125 is substantially less than the diameter D (FIG. 2) of the fully assembled modular support structure 120. The reduced height of the module 125 may permit installers to install or replace rotary disc filter assemblies 100 at a faster rate than was previously possible with a pre-assembled single-piece center shaft or pre-assembled single-piece center support structure.

Figure 7:
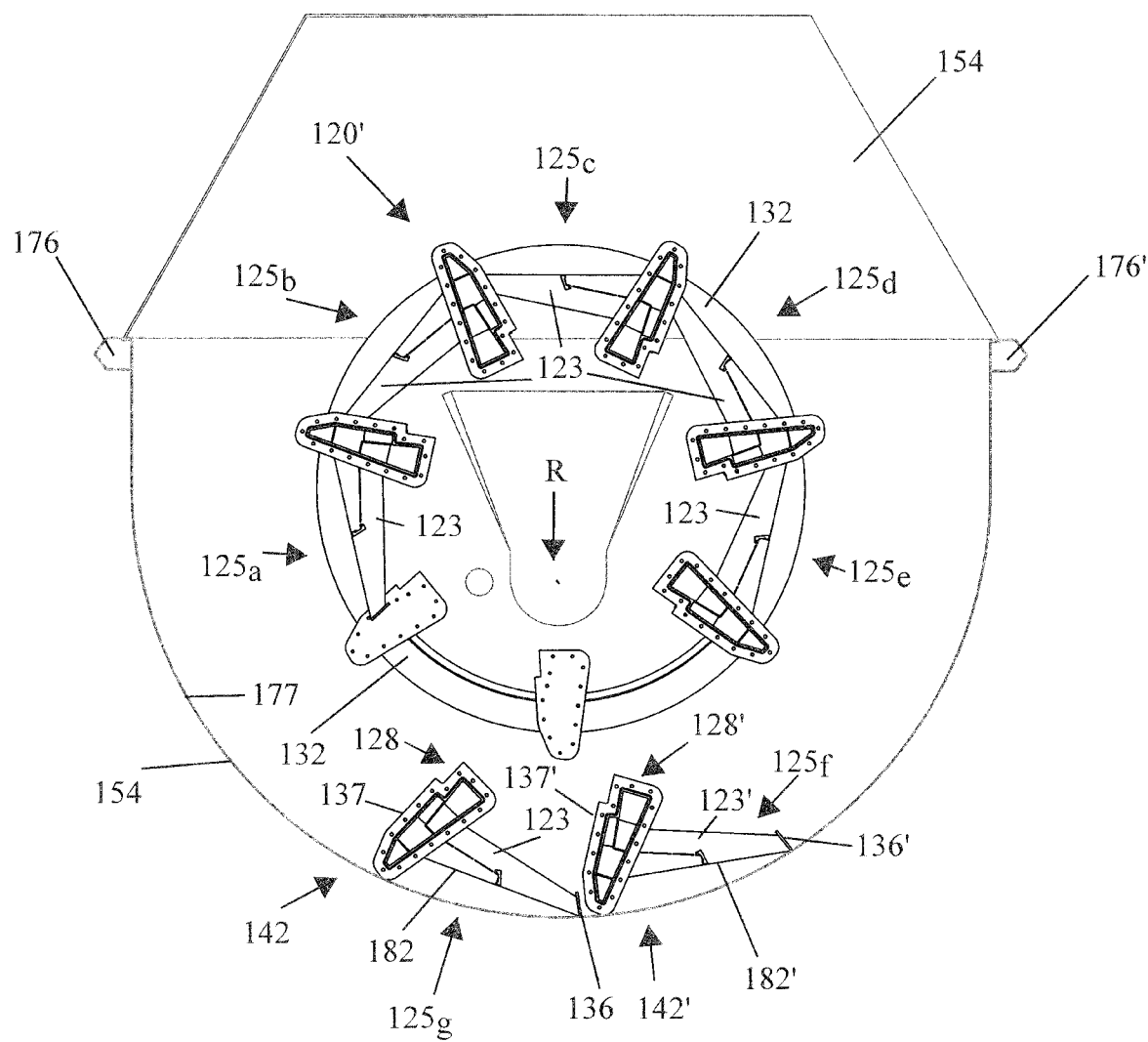
FIG. 7 is a schematic side view of an exemplary module comprising seven modules within the vat of the rotary disc housing.

FIG. 7 is a schematic side view of a partially assembled modular support structure 120' comprising modules 125a-125e. As the installers assemble the modular support structure 120, the operators engage the second end 129 (FIG. 2) of each hollow axial conduit $127_a$ to the side 122 of the bearing assembly 132. Installers may engage two or more modules 125f-125g before engaging the two or more modules 125f-125g to the partially assembled modular support structure 120'.

Figure 8A:
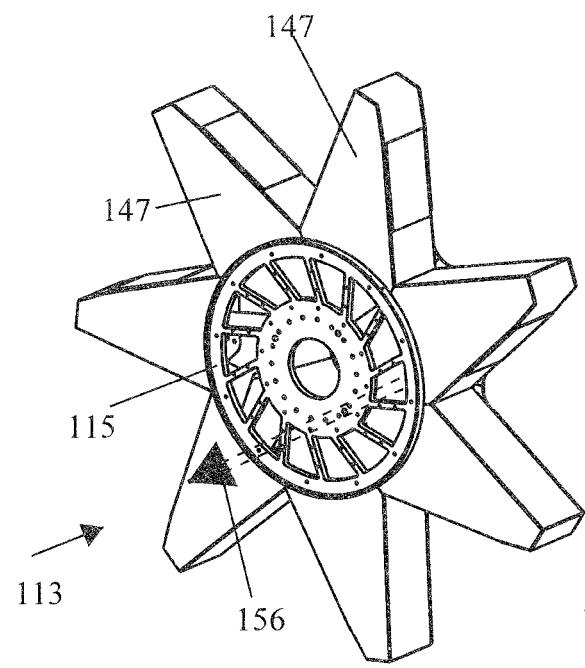
FIG. 8A is a facing perspective view of a drainage assembly of an exemplary modular support structure.
Figure 8B:
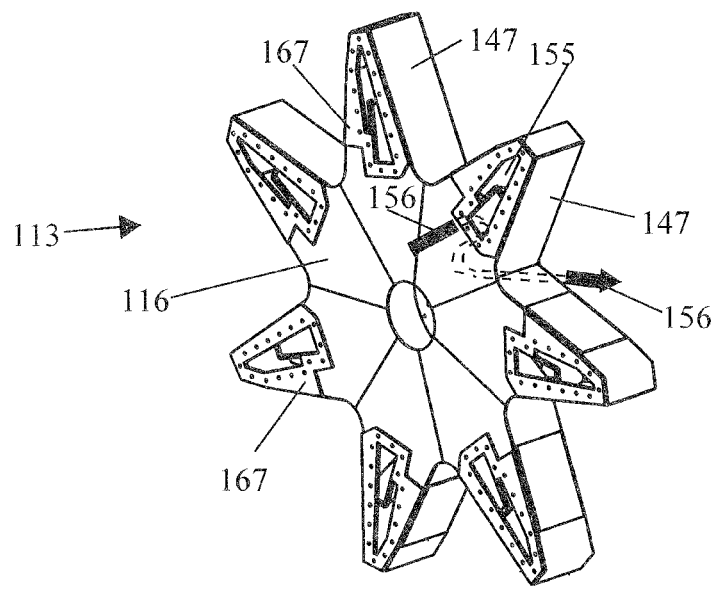
FIG. 8B is a perspective view of the rear side of the drainage assembly of FIG. 8A.

FIG. 8A and FIG. 8B show a drainage assembly 113 configured to be disposed at the drainage end 112 of a rotary filter. The depicted drainage assembly 113 as a radial arm 147 for each module 125 that comprises the modular support structure 120. The flange 159 at the first end 128 of each axial conduit $127_a$ engages a plate 167 on the backside 116 of the drainage assembly 113. The drainage assembly 113 has one or more cavities 155 extending through each radial arm 147 to the faceplate 115. The cavities 155 fluidly communicate with the axial chambers $158_a$, $158_b$ thereby permitting filtrate 156 to flow down through the radial arm 147 toward the axis of rotation R and out of the faceplate 115 for further processing or disposal.

FIG. 9 is a partially exploded schematic perspective view of a rotary drum filter 102 having an exemplary modular support structure 120. The radially outer surface 183 of each module 125 is an arc of a reference circle 145. A single module 125 is shown above the modular support structure 120 to better illustrate the features of the embodiment. A transverse beam 123 extends from an axial arm 127 of a module 125. An axial conduit $127_a$ is disposed on the transverse beam 123 radially outward from the transverse beam 123. The transverse beam 123 has a distal end 136 configured to engage a second side 137' of an adjacent axial arm 127' of an adjacent module 125'. A fastening mechanism engages the distal end 136 to the adjacent second side 137'. Likewise, a fastening mechanism engages the first end 142 of the module 125 to the drainage assembly 113. Fastening mechanisms further engage the distal end 143 of the module to the bearing assembly 132. In a rotary drum filter 102, filtrate 156 generally flows through the radially outer surface 183 and through the axial conduit $127_a$ before exiting the drainage end 112 of the rotary drum filter 102 through the drainage assembly 113.

An exemplary rotary filter support assembly comprises: a drainage assembly 113 disposed at a drainage end 112, the drainage end 112 being distally disposed from a second end 130, multiple support structure modules 125 disposed annularly around an axis of rotation R, the support structure modules 125, 125', 125" comprising a first module 125 and an adjacent module 125', the first module 125 comprising: a first end 142 configured to fixedly engage the drainage assembly 113, a distal end 143, an axial arm 127 disposed between the first end 142 and the distal end 143, and a transverse beam 123 extending outwardly from the axial arm 127, and configured to extend toward the adjacent module 125', and wherein a distal end 136 of the transverse beam 123 is configured to fixedly engage the adjacent module 125'.

The first end 142 of the first module 125 can be configured to engage the drainage assembly 113 and the distal end 136 of the transverse beam 123 can be configured to engage the adjacent module 125' through a fastening mechanism selected from the group consisting of: fasteners, clamps, pins, locks, locking mechanisms, key and socket mechanisms, spot welding, welding, and adhesives.

An exemplary method for installing a rotary filter modular support 120 structure comprises: (a) inserting a support structure module 125 into a rotary filter housing 154, the support structure module 125 comprising: an axial arm 127 having a first end 128 distally disposed from a second end 129 and a first side 134 distally disposed from a second side 137, the first side 134 and second side 137 extending between the first end 128 and second end 129, and transverse beams 123 extending from the first side 128 of the axial arm 127, wherein a transverse beam 123 extending from the first side 134 of the axial arm 127 has a distal end 136 distally disposed from a support end 139 engaged to the first side 134 of the axial arm 127, and wherein the distal end 136 is configured to engage a second side 137' of an adjacent support structure module 125' with a fastening mechanism. (b) inserting the adjacent support structure module 125' into the rotary filter housing 154, (c) engaging the distal end 136 of the transverse beams 123 of the support structure module 125 to the second side 137' of the adjacent support structure module 125', (d) repeating steps (a)-(c) until the rotary filter modular support structure 120 is assembled.

An exemplary disc filter modular support structure 120 comprises: a drainage assembly 113 disposed at a drainage end 112, the drainage end 112 being distally disposed from a second end 130; multiple support structure modules 125, 125', 125" disposed annularly around an axis of rotation R, wherein each support structure module 125 is configured to engage the drainage assembly 113 through a fastening mechanism, each of the support structure modules 125, 125', 125" comprising: an axial conduit $127_a$ extending between the drainage assembly 113 and the second end 130, and multiple transverse drainage conduits $123_a$ extending outwardly from the axial conduit $127_a$ toward the adjacent support structure module 125', wherein the multiple transverse drainage conduits $123_a$ fluidly communicate with the axial conduit $127_a$, and wherein a distal end 136 of at least one of the multiple drainage conduits $123_a$ is configured to fixedly engage the adjacent support structure module 125' through the fastening mechanism, the fastening mechanism selected from the group consisting of: fasteners, clamps, pins, locks, locking mechanisms, key and socket mechanisms, spot, welds, welds, and adhesives.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A rotary filter support assembly comprising:
   a drainage assembly disposed at a drainage end, the drainage end being distally disposed from a second end;
   multiple support structure modules disposed annularly around an axis of rotation, the support structure modules comprising a first module and an adjacent module, the first module comprising:
   a first end configured to fixedly engage the drainage assembly;
   a distal end;
   an axial arm disposed between the first end and the distal end; and
   a transverse beam extending outwardly from the axial arm, and configured to extend toward the adjacent module, and wherein a distal end of the transverse beam comprises a solid portion configured to terminate a distal end of a transverse drainage conduit of the transverse beam, and wherein the solid portion is removably connected to a solid portion of the adjacent module.

2. The rotary filter support assembly of claim 1, wherein the first end of the first module is configured to engage the drainage assembly and the solid portion of the distal end of the transverse beam is configured to engage the solid portion of the adjacent module through a first fastening mechanism selected from the group consisting of: fasteners, clamps, pins, locks, locking mechanisms, and key and socket mechanisms.

3. The rotary filter support assembly of claim 2, wherein the distal end of the first module is configured to engage a bearing assembly through a second fastening mechanism.

4. The rotary filter support assembly of claim 1 further comprising multiple transverse beams, wherein a portion of a transverse beam of the multiple transverse beams is the transverse drainage conduit, wherein the axial arm is an axial conduit, and wherein the transverse drainage conduit fluidly communicates with the axial drainage conduit.

5. The rotary filter support assembly of claim 4, wherein the multiple support structure modules further comprise multiple sector guides, wherein a first sector guide is disposed on the transverse beams and a second sector guide is disposed on the axial arm, and wherein the sector guides extend outwardly from the axis of rotation.

6. The rotary filter support assembly of claim 5, wherein disc sectors are disposed between the sector guides.

7. The rotary filter support assembly of claim 4, wherein the transverse drainage conduit further comprises multiple chambers, wherein each of the multiple chambers fluidly communicates with the axial conduit.

8. The rotary filter support assembly of claim 1, wherein the multiple support structure modules comprise between 5 and 36 support structure modules.

9. The rotary filter support assembly of claim 1 further comprising multiple transverse beams disposed in parallel on the axial arm, wherein solid portions of the distal ends of each of the transverse beams are removably connected to solid portions of the adjacent module through a fastening mechanism.

10. A method for installing a rotary filter modular support structure comprising:
    (a) inserting a support structure module into a rotary filter housing, the support structure module comprising:
       an axial arm having a first end distally disposed from a second end and a first side distally disposed from a second side, the first side and second side extending between the first end and second end; and
       transverse beams extending from the first side of the axial arm, wherein a transverse beam extending from the first side of the axial arm has a distal end comprising a solid portion distally disposed from a support end engaged to the first side of the axial arm, and wherein the solid portion of the distal end is configured to terminate a distal end of a transverse drainage conduit of the transverse beam, and wherein the solid portion is removably connectable to a solid portion of a second side of an adjacent support structure module with a fastening mechanism;
    (b) inserting the adjacent support structure module into the rotary filter housing;
    (c) engaging the distal end of the transverse beams of the support structure module to the second side of the adjacent support structure module;
    (d) repeating steps (a)-(c) until the rotary filter modular support structure is assembled.

11. A disc filter modular support structure comprising:
    a drainage assembly disposed at a drainage end, the drainage end being distally disposed from a second end;
    multiple support structure modules disposed annularly around an axis of rotation, wherein each support structure module is configured to engage the drainage assembly through a first fastening mechanism, each of the support structure modules comprising:
       an axial conduit extending between the drainage assembly and the second end; and
       multiple transverse drainage conduits extending outwardly from the axial conduit toward an adjacent support structure module, wherein the multiple transverse drainage conduits fluidly communicate with the axial conduit, and wherein a distal end of at least one of the multiple transverse drainage conduits comprises a solid portion configured to terminate a distal end of the at least one of the multiple transverse drainage conduits, and wherein the solid portion is removably connected to a solid portion of the adjacent support structure module through a second fastening mechanism, the first and second fastening mechanisms selected from the group consisting of: fasteners, clamps, pins, locks, locking mechanisms, and key and socket mechanisms.

12. The disc filter modular support structure of claim 11, wherein the multiple support structure modules further comprise multiple sector guides, wherein a first sector guide is disposed on the transverse drainage conduits and a second sector guide is disposed on the axial conduit, and wherein the sector guides extend outwardly from the axis of rotation.

13. The disc filter modular support structure of claim 12, wherein disc sectors are disposed between the sector guides.

14. The disc filter modular support structure of claim 11, wherein the multiple support structure modules comprise between 5 and 36 support structure modules.

15. The disc filter modular support structure of claim 11, wherein the transverse drainage conduits each further comprise multiple chambers, wherein each of the multiple chambers fluidly communicates with the axial conduit of the support structure module.

* * * * *